(12) United States Patent
Fortin et al.

(10) Patent No.: US 7,756,028 B2
(45) Date of Patent: Jul. 13, 2010

(54) PULSED BACKPRESSURE MECHANISM FOR REDUCED FIFO UTILIZATION

(75) Inventors: Eric Fortin, Nepean (CA); David Martin Harvey, Kanata (CA); Michael Ah-kee, Kanata (CA)

(73) Assignee: Alcatel Lucent, Paris (FR)

( * ) Notice: Subject to any disclaimer, the term of this patent is extended or adjusted under 35 U.S.C. 154(b) by 1112 days.

(21) Appl. No.: 11/412,085

(22) Filed: Apr. 27, 2006

(65) Prior Publication Data

US 2007/0253333 A1    Nov. 1, 2007

(51) Int. Cl.
*H04J 1/16* (2006.01)
(52) U.S. Cl. .................... 370/230.1; 370/252; 370/357; 370/391; 370/412
(58) Field of Classification Search ......... 370/230–236, 370/252–253, 357, 359, 381, 386, 358, 391, 370/412, 413
See application file for complete search history.

(56) References Cited

U.S. PATENT DOCUMENTS

| | | | |
|---|---|---|---|
| 6,396,809 B1 | 5/2002 | Holden et al. | |
| 6,973,032 B1 | 12/2005 | Casley et al. | |
| 7,047,310 B2 * | 5/2006 | Bedekar et al. | 709/232 |
| 2004/0257991 A1 | 12/2004 | Sterne et al. | |
| 2006/0098672 A1 * | 5/2006 | Schzukin et al. | 370/412 |

* cited by examiner

*Primary Examiner*—Ricky Ngo
*Assistant Examiner*—Gary Mui
(74) *Attorney, Agent, or Firm*—Kramer & Amado P.C.

(57) ABSTRACT

The backpressure mechanism and method described here do not completely shut off the traffic when a queue is experiencing congestion. Instead of completely shutting off the traffic and waiting for the effects, a series of backpressure pulses are sent to the upstream stage for intermittently slowing the traffic between the upstream and downstream stages. These pulses of backpressure effectively slowly down the rate of the ingress traffic to the queue to a rate less than the egress rate. This allows queue utilization to slowly decrease. These pulses continue as long as the queue utilization is above a threshold called "Starving Threshold". This technique allows much lower queue utilization, thus requiring smaller queues sizes.

24 Claims, 3 Drawing Sheets

PULSED BACKPRESSURE MECHANISM FOR REDUCED FIFO UTILIZATION

FIELD OF THE INVENTION

The invention is directed to communication networks and in particular to a pulsed backpressure mechanism for reduced block utilization.

BACKGROUND OF THE INVENTION

Network elements (NEs) use buffer memories, queues or FIFO's (collectively referred here as queues) for temporarily storing data units (referred here as packets) while the node processes the packet headers and executes other appropriate actions. Queues are also used to regulate the flow of packets between two nodes or between two stages of modules which make up a node or nodes. The transfer of data packets between the NEs or within a NE is regulated by using available FIFO space upstream of a congested stage to temporarily store packets intended for it. The queues must, however, be managed properly so that they do not overflow or underflow. For example, when a queue receives packets faster than it can dispose of them, the packets build up in the queue, resulting in a queue overflow. On the other hand, when the queue receives packets slower than it is capable of draining, a starved queue or a queue underflow results. In either situation, the performance of the network suffers.

A flow control mechanism between two consecutive queues is therefore needed to prevent overflow or underflow. In general, a flow control signal is a binary signal transmitted periodically from the downstream queue to the upstream queue to enable (Go) or disable (Stop) transmission of the next packet from the upstream queue. Such a flow control signal is typically referred to as a backpressure control signal. FIG. 1 shows a very simple illustration of two stages 10 and 12 along a certain connection established over a data network, where the packets are queued for processing and regulating the flow speed according to the QoS for the respective connection.

The stages 10, 12 may be provided on a same card (e.g. on a linecard, or on a switch fabric card, etc), on the same NE, or on distinct NE's; FIG. 1 provides just an example. Each stage uses a respective queue 2, 4. For the traffic direction shown in FIG. 1 (let's call it forward direction), queue 2 is the upstream queue which transmits packets at controlled intervals of time, and queue 4 is the downstream queue, which receives the packets from queue 2. It is to be noted that the upstream queue 2 at the upstream stage 10 is shown only by way of example; the packets may be delivered to downstream queue 4 by any traffic management device backpressured by mechanism 5 provided at the downstream stage 12.

Transmission of packets from queue 2 is controlled by a queue controller 3 at the upstream stage, while a backpressure mechanism 5 at the downstream stage checks the congestion status of queue 4. We denote with C the maximum rate (e.g., bits/sec, bytes/sec, cells/sec, etc) at which packets arrive to the second stage 12 into downstream queue 4; we also assume that the maximum transmit rate downstream from stage 12 is also C. In order to regulate the flow rate, backpressure mechanism 5 compares the queue occupancy Q with a configured threshold F. If the queue occupancy Q exceeds the threshold (Q>F), the backpressure control signal generated by unit 5 instructs controller 3 to temporarily stop transmission of packets from queue 2. If the queue occupancy Q is less than the threshold F (Q<F), the backpressure mechanism 5 instructs controller 4 to continue transmission of packets from queue 2 to queue 4.

However, the backpressure control signal cannot stop the data flow instantaneously, so that queue 4 continues to receive packets for a certain amount of time T called "round trip time". The round trip time is determined as the sum of the maximum latency from the point in time that a queue threshold F is crossed to the point in time that the first stage 10 stops sending traffic to that queue, denoted with T1, plus the maximum time T2 a packet needs for transfer between the output of the first stage queue 2 to the second stage queue 4. In other words, T=T1+T2.

The value of T for a high speed router is on the order of multiple microseconds. The value of C for a high speed router is on the order of ten Gbps. As a result, several Mbits of storage are required in the second stage device for ensuring a proper flow rate. In some cases, for a given architecture, a large round trip time T or a small storage capacity at the second stage may require an intermediate queuing stage between first stage 10 and second stage 12. On occasions, this scenario may possibly affect feasibility of a given system design.

In addition, a large round trip time results in the need to design larger FIFOs, for storing the packets arrived after the threshold has been crossed. This situation is particularly relevant to synchronization of line side traffic at the output of stage that uses FIFOs (e.g. on a line card, a framer).

Furthermore, in order to minimize cost and board area, the second stage device storage is ideally internal to the device. The number of queues in a NE device may be very large. For example, if the second stage is a fabric interface device, it may contain several hundred queues, so that the queues consume a very large amount of memory. If we take into account the round trip time T, the downstream queue needs to store more data on a per physical port basis. Therefore, it is important to find a way of reducing the storage requirement in the second stage device.

U.S. Patent Application (Sterne et al.) Publication number 20040257991, entitled "Backpressure history mechanism in flow control" discloses a mechanism for monitoring the amount of traffic which is on the way toward the downstream queue during the past period of the round trip time. In this way, a more precise control of the traffic flow is possible, realizing reduction of storage space in the queue by one half. Preferably, a historical record of flow control signals sent back during the most recent flow control round trip time is kept and updated for further enhancing the flow control. While this U.S. Patent Application addresses the same problem as the present invention, it provides an entirely different solution.

U.S. Pat. No. 6,396,809 (Holden et al.), entitled "Method for signaling in a high speed communication system" and U.S. Pat. No. 6,973,032 (Casley et al.) entitled "Selective backpressure control for multistage switches" describe several variations of backpressure schemes. However, none of these patents uses a pulsed backpressure mechanism as in the present invention.

SUMMARY OF THE INVENTION

It is an object of the invention to provide a backpressure mechanism for controlling traffic flow rate that alleviates totally or in part the drawbacks of the existing backpressure mechanisms.

It is another object of the invention to provide a backpressure mechanism for reducing memory utilization for the queues at a node of a data network.

Accordingly, the invention provides a method of synchronizing the packet rate R of a traffic flow at the egress side of a queue in a downstream stage with the packet rate R1 at an upstream stage, comprising the steps of: a) continuously assessing the status of the queue; b) shaping the packet rate at the upstream stage at a rate R1 higher than the packet rate R at the egress of the queue when the queue operates in a starving mode; and c) shaping the rate R1 lower than the rate R when the queue operates in a satisfied mode.

According to another aspect, the invention provides a backpressure flow control mechanism for synchronizing the packet rate R of a traffic flow at the egress side of a queue in a downstream stage with the packet rate R1 at an upstream stage of a network element, comprising: means for continuously assessing the status of the queue; a shaper profile memory for storing a shaping profile for the traffic flow, in accordance with a traffic parameter; and means for shaping the rate R1 at a value lower than the rate R based on the shaping profile, whenever the queue operates in a satisfied mode.

Advantageously, the backpressure mechanism of the invention reduces the utilization of the queues, resulting in savings in the memory used and the complexity of controlling the traffic flow.

The invention is preferably applicable to the framer devices receiving traffic from a traffic management device. The invention is also suitable for configurations in which multiple upstream queues transmit traffic to multiple downstream queues over separate links, a bus, and/or logically partitioned buses.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

As indicated above, current backpressure mechanisms completely stop the traffic when the downstream FIFO register is full. However, current flow control schemes are not instantaneous in that latency always exists between action and reaction, resulting in a flow control round trip time T which is about 500 milliseconds. This flow control round trip time causes ambiguity in determining the amount of traffic "in transit" between the upstream and the downstream stages, as shown and explained in connection with FIG. 1.

Figure 2:
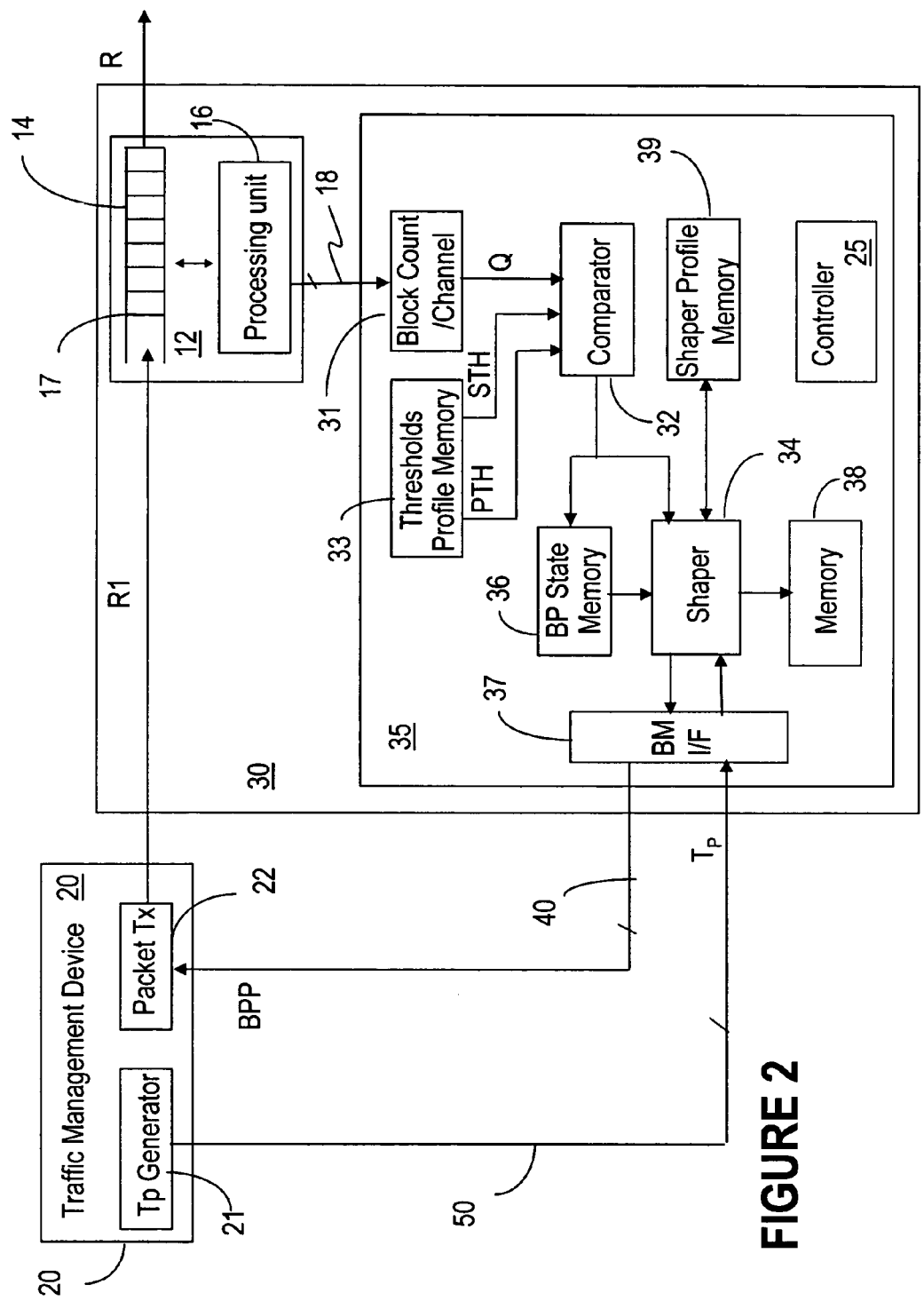
FIG. 2 shows a block diagram of the backpressure mechanism according to an embodiment of the invention.

FIG. 2 shows a block diagram of the backpressure mechanism according to an embodiment of the invention, illustrating an upstream stage 20 that feeds packets into a FPGA 12 provided at a downstream stage 30. A packet transmitter 22 at the traffic management device (TMD) 20 illustrates generically transmission of packets to the downstream stages under control of the backpressure signal according to the invention. The maximum packet size that an interface may handle (in Bytes) is denoted in the following with MTU (Maximum Transmission Unit). Relevant to the invention, TMD 20 also includes a polling generator 21 that transmits to the downstream stage 30 pulses of period $T_p$ for enabling the downstream stage to shape the backpressure signal according to the channel parameters (rate) and the block utilization, as seen later.

The FGPA 12 is shown as having a first-in first-out register 14 (FIFO register, also referred to as a queue), and a processing unit 16 illustrating generically the hardware and software used for transferring the packets in and out of the FIFO, measuring utilization Q of queue 14, and performing other general housekeeping operations. The block utilization Q is measured in equally sized blocks 17; the size of the blocks is programmable and depends on the traffic type (ATM, IP) e.g. for a ×2 kB FIFO, the blocks could be 64 B. Therefore, the occupancy of FIFO register 14 is referred in the following as "block utilization".

FIG. 2 also shown a backpressure mechanism (BPM) 35 at the downstream stage 30, which controls the amount of transit traffic (i.e. the traffic which is on the way between the upstream and the downstream stages) during each round trip time. As an example, the upstream stage 20 could be a traffic management device at the fabric side of a switch, FIFO 14 being in this case provided at the egress side of a switch, namely at a framer device. The framer handles a plurality of channels that all use FIFO register 14. The backpressure mechanism in this case synchronizes the physical egress line rates R (physical line side) with the rates R1 of the channels received from the traffic management device 20 (fabric side). In the following we use R and R1 in a general way, to refer to the rate at the ingress and respectively egress side of downstream FIFO 14 for any channel Ch.

In order to synchronize the physical line side with the fabric side, the traffic management device 20 needs to shape the ingress side traffic at a rate R1 faster than the line rate R, so that the line is not under-run; this will happen if the FIFO register 14 is depleted (starved). On the other hand, the downstream stage receiving traffic from device 20 needs to backpressure the traffic management device 20 when the downstream register is too full.

Figure 1:
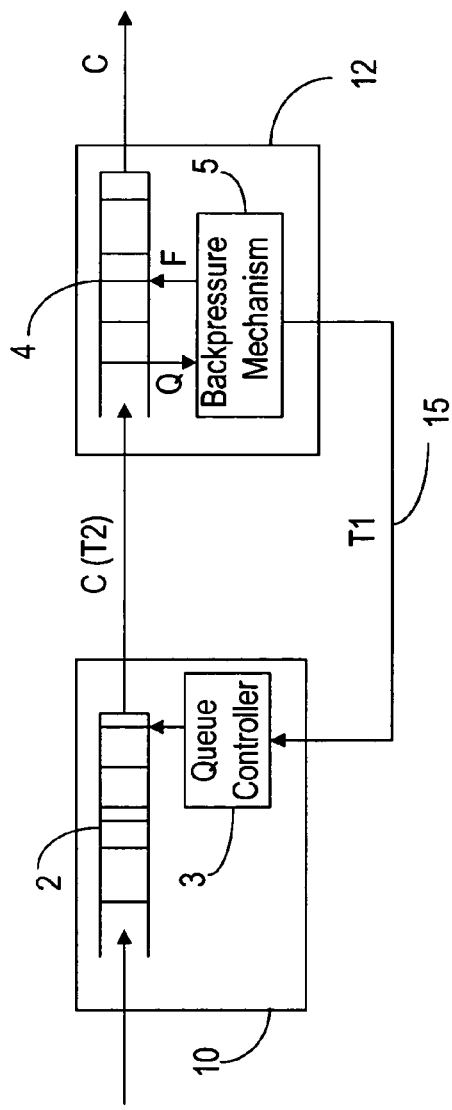
FIG. 1 illustrates a simplified illustration of a backpressure mechanism.

According to the invention, instead of completely shutting off the traffic when block utilization Q crosses a threshold set to indicate an overflow, and waiting for the effect of traffic stop as in the embodiment of FIG. 1, a series of backpressure pulses BPP are send to packet transmitter 22 instructing it to stop and start transmission of packets for as long as the downstream queue is too full. The backpressure pulses effectively slow down the traffic by lowering fabric rate R1 with respect to line rate R.

Stopping the traffic completely as in the current backpressure schemes, requires provision of a larger amount of storage in the downstream stage 30 so as not to under-run downstream queues during the time the upstream stage does not transmit. By using backpressure pulses, block utilization in stage 30 decreases slowly, so that depletion of queue 14 takes a longer time than if the packets were stopped altogether. Thus, the effect of the round trip time T is handled gently, and without the need to use a larger buffer size. This enables use of a smaller amount of storage compared with the current implementations.

Figure 3:
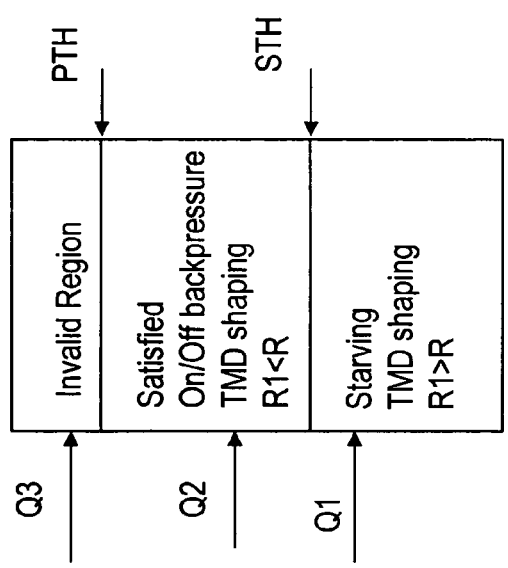
FIG. 3 shows the utilization thresholds according to the invention.

FIG. 3 shows the status of FIFO register 14 for various values of block utilization Q, with respect to the thresholds established according to the invention. Operation of the BM 35 is based on use of a "starving threshold" (STH), which triggers the onset of the backpressure pulses. Thus, when the block utilization is below the starving threshold STH as shown by Q1, FIFO register 14 is in a starving state, where it receives packets at an ingress rate R1 greater than the egress rate R. Once the starving threshold is crossed, Q2>STH, the FIFO register 14 is in a satisfied state, and the rate at which the packets arrive should be slowed-down, to avoid queue overflow. In this state, the BM 35 causes the TMD 20 to transmit packets at an ingress rate R1 lower that the egress rate R, using the backpressure pulses. BM 35 continues to start/stop transmission of packets from traffic management device 20 as long as the block utilization Q is above STH.

The backpressure mechanism 35 stops packet transmission from upstream stage 30 for a short period of time denoted with BP_ON (backpressure ON), followed by a short period when the backpressure is turned off to allow transmission of packets, denoted with BP_OFF, and the pulses are shaped (duration of BP_ON and BP_OFF) so as to obtain a certain rate of slowdown of the transmitter 22 according to the FIFO state for each channel. The starving threshold STH is programmable for each channel, and stored in threshold profile memory 33. The SDH profiles (values) are set for each channel (or rather for various speeds used by the respective stages) according to the maximum latency t from the time the upstream stage 20 received the backpressure command and the time that the effect of this backpressure is felt by the downstream stage FPGA 30. The value of STH also depends on the channel speed, channel overhead and MTU (indirectly).

Ideally, the STH should be set high enough to avoid queue under run. However, the number of channels served by the buffer impacts the STH. Thus, if the FIFO 14 serves a large number of channels, the STH should be set lower in order to accommodate all channels. On the other hand, in configurations where the FPGA 12 can only handle a total of 8K packet descriptors for all channels, the STH should be set as low as possible. For example, for ATM traffic, each cell uses one packet descriptor, so that the FIFO for the respective channel is limited to 8K cells. As such, STH is set as a compromise for satisfying these conflicting requirements.

There could be a case when the configured shape of the BP pulses is not reducing the incoming rate enough, due e.g. to wrong settings. In this situation, the block utilization continues to increase instead of decreasing thus making it pass a peak utilization threshold (PTH), as seen on FIG. 3 at Q3. In this region, the backpressure mechanism 35 stops BPP generation and instead sends a continuous backpressure command as long as the Q is above the PTH. The peak utilization threshold PTH is also configurable distinctly for each channel, and stored in thresholds profile memory 33. Configuration of this threshold is based on the maximum packet size (MTU) that the respective port can handle.

The value of the thresholds STH and PTH is also measured in bocks 17. As an example, thresholds profile memory 33 could be a memory where each channel is allocated a 16 bits field, where 12 bits may be used for storing the STH and 4 bits may be used for a value called "peak offset" used for determining the PTH. Peak offset is only used to flag a configuration problem. If the wrong threshold profile is used for the STH, the "peak offset" will prevent the miss-configured channel to use all the buffer space in the FIFO.

The peak offset determines PTH according e.g. to the following relation:

$$PTH = STH + 2^{Peak\_offset}$$

For example, the peak offset is set in the case of IP traffic based on the maximum permitted packet size, which is MTU for the respective flow. This is because a full packet needs to be input into the FIFO register before it is processed. Thus, the FIFO register can potentially grow to the maximum permitted packet size. As such, the peak offset should be set to a value higher than the MTU size.

Returning now to FIG. 2, the backpressure mechanism 35 keeps track of the running block count per channel. In the example of FIG. 2, this information is transmitted over an information bus 18 from processing unit 16 to a block count per channel unit 31, which counts, as the name suggests, the blocks in FIFO register 14 used by each channel. For example, for a channel Ch, clock 31 increases a channel count when an en-queue is received (a new packet arrives in FIFO register 14 for Ch) and decreases the respective count when a de-queue is received (a packet is transmitted from FIFO 14 on Ch). The block utilization Q is then compared in comparator 32 with STH, and when STH is crossed for Ch, comparator 32 causes a shaper 34 to start sending backpressure pulses to upstream stage 20 for dropping the ingress rate R1 for that channel (channel Ch). When the PTH is crossed, the backpressure is disabled altogether, irrespective of the buffer occupancy.

Comparator 32 also updates a state memory 36, which keeps track of the state of FIFO register 14 for each channel. Thus, when STH is crossed for Ch, the record for Ch in state memory 35 is updated, to indicate that queue 14 is in a satisfied state. As an example, state memory 36 may use 8 bits for each channel, where 2 bits indicate the FIFO state; a "starving" state may be designated by a 00 value, a "satisfied" state by a 01 value, an "invalid" state by a 11 value.

Figure 4:
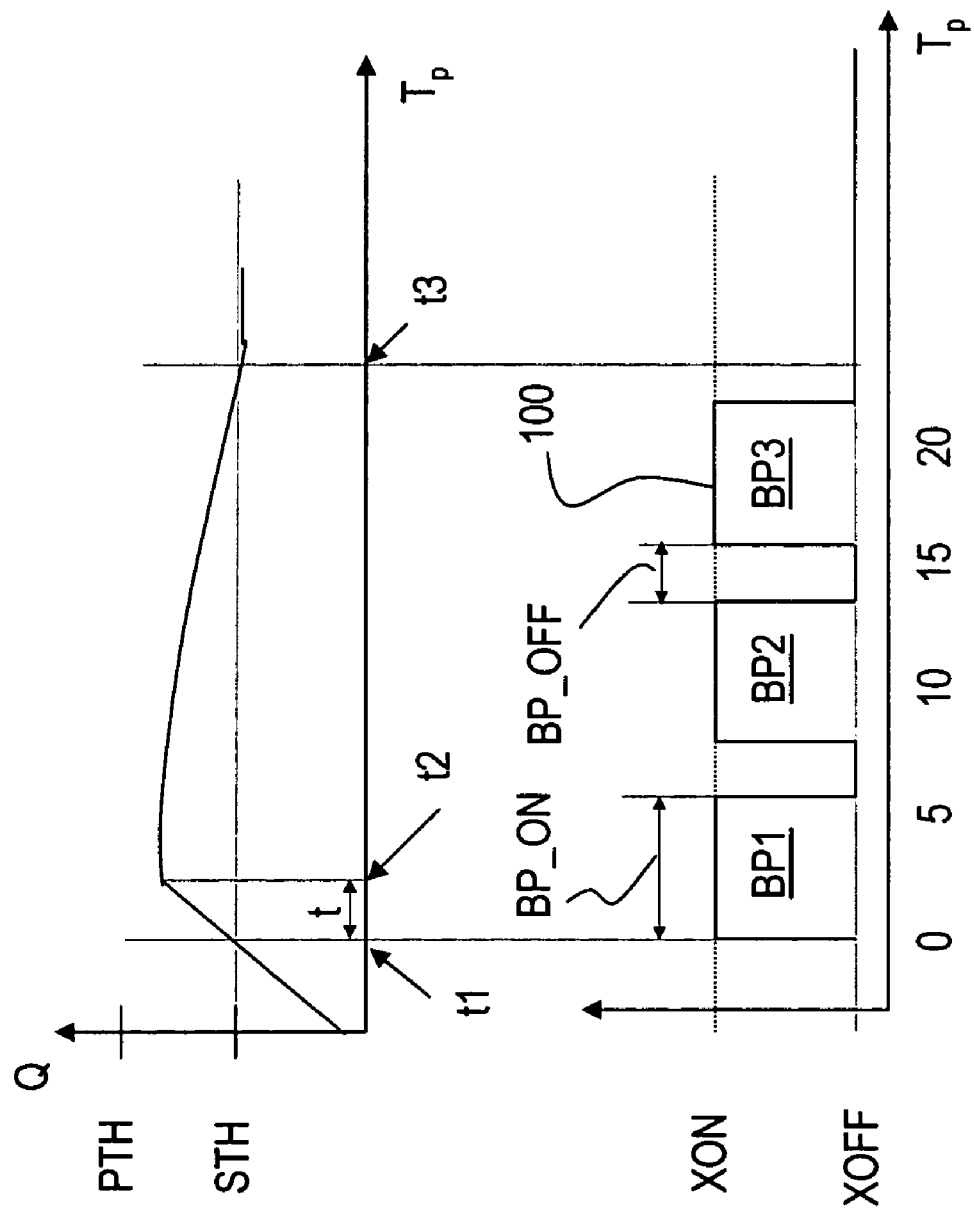
FIG. 4 shows a time diagram illustrating generation of backpressure pulses when the block utilization is over the starving threshold.

In the meantime, the traffic management device 20 continuously polls the status of every channel through the BM interface 37 using a bus 50 provided between the stages 20 and 30. This is shown generically by polling generator 21 provided at the upstream stage 20. Every channel is polled at a respective period $T_p$ specified by polling generator 21, and provided to shaper 34 of BM 35 over interface 37. Shaper 34 toggles between XON, XOFF on every poll period $T_p$ as shown in FIG. 4, and transmits these pulses to TMD 20 for controlling the transmission of the packets. The effect of this will be a reduction of traffic rate anywhere from 0% and 100%.

The backpressure shaping is dependent on the backpressure mechanism polling period $T_p$. As seen in FIG. 4, there are two parameters that control the Backpressure shaping rate, namely a BP_ON period, which provides the amount of backpressure mechanism polling periods of backpressure "on", and a BP_OFF period, which provides the amount of backpressure mechanism polling periods of backpressure "off". Each time the shaper 34 is polled by the traffic management device 20, it updates a shaper memory 38 with the current count for the, duration of the respective BP count, and reads the state memory 36 to determine if the Q is still greater than STH. Shaper memory 38 maintains a count for the number of backpressure pulses. For example, if the records in memory 38 are 16 bits long, 8 bits may be used for a storing the BP count, i.e. the current number of polling pulses for BP_ON or BP_OFF periods. The record also uses a state bit indicating if the current BP count refers to BP_ON or BP_OFF, and four bits for different categories of channel speeds.

The shaper also uses a shaper profile memory 39 which enables it to generate various formats for the shaping pulses (the duration of BP_ON or BP_OFF periods). For example, if the records in memory 39 are 16 bits long, 8 bits may be used for keeping programmed values for the BP_ON (counting the polling periods the backpressure should be kept "on") and the reminder of 8 bits may be used for keeping programmed values for the BP_OFF (counting the polling periods the backpressure should be kept "off").

FIG. 4 shows the time diagram illustrating generation/shaping of backpressure pulses when the block utilization is over the starving threshold. As seen, at a certain time t1 the block occupancy Q increases over the starving threshold STH. In this case, the shaper 34 begins transmitting a backpressure pulse BP1. The shaping period is provided by the respective record in the shaper profile memory 29. Now, the shaper starts counting the $T_p$ periods starting with the moment the STH was crossed; this count for both the "on" and "off" periods is kept in shaper memory 38.

profiles are used currently, but programming seven more profiles is possible. For each speed, a maximum overhead of 12.5% was used in the calculations; thus any channel requiring less than 12.5% will work. Also, a MTU of 9K has been used to determine the Peak offset value. The maximum latency t values used are these provided by AMCC suggested values for setting the threshold for a device called Tigris, which in the present case is replaced by the FGPA register 14. Latency t was calculated using these recommended values, which resulted in a t between 500 microseconds to 10 milliseconds, depending on the traffic rate. Table 1 uses the values for t established in this way

TABLE 1

| | Profiles | STH | Peak offset | PTH | BP_ON | BP_OFF |
|---|---|---|---|---|---|---|
| 0 | OC12 (max overhead 12.5%) 9K MTU | 114 | 8 | 370 | 2 | 9 |
| 1 | OC3 (max overhead 12.5%) 9K MTU | 60 | 8 | 316 | 6 | 16 |
| 2 | STS-1 (max overhead 12.5%) 9K MTU | 42 | 8 | 298 | 18 | 43 |
| 3 | E3 (max overhead 12.5%) 9K MTU | 42 | 8 | 298 | 26 | 65 |
| 4 | DS3 (max overhead 12.5%) 9K MTU | 36 | 8 | 292 | 20 | 58 |
| 5 | E1 (max overhead 12.5%) 9K MTU | 6 | 8 | 262 | 44 | 87 |
| 6 | DS1 (max overhead 12.5%) 9K MTU | 6 | 8 | 262 | 57 | 112 |
| 7 | 64K (max overhead 12.5%) 9K MTU | 2 | 8 | 258 | 0 | 0 |
| 8-14 | RFU | 4096 | 0 | 0 | 0 | 0 |
| 15 | Disabled (both shaper and threshold) | 4096 | 0 | 0 | 0 | 0 |

The effect of the backpressure is sensed at the ingress of the queue 14 after time t, when the block occupancy Q begins to drop slowly, as seen in the upper graph starting from time t2. In the meantime, as long as the state of queue 14 asserted by block count 31 is "satisfied", the shaper continues to count the number of $T_p$ periods and continue to transmit backpressure pulses to transmitter 22. The shaper continuously compares the respective programmed (profile) values for the BP_ON and BP_OFF with the current values, and stops asserting backpressure when the current values coincide with the programmed values. At that time, if the block utilization dropped under the starving threshold, as shown at time t3 on FIG. 4, the shaper stops transmitting the backpressure pulses altogether. If at time t3 the block occupancy Q is still greater than STH, shaper 34 continues asserting the backpressure pulses using the same profile Preferably, backpressure (BP_ON) is selected according to the line rate R, and preferably is asserted for at least twice the period of the line rate. BP_OFF is dependent on the interfaces overhead; the more overhead, the more BP shaping is required in order to slow down the upstream stage enough. As seen in FIG. 4, BP_ON and BP_OFF also depend on the polling period $T_p$. The programmed amount of BP_ON and BP_OFF, or the effective shaping (which are measured preferably in polling periods) (can be calculated as: BP_OFF*Rate/(BP_OFF+BP_ON).

In a preferred embodiment of the invention, 16 profiles may be programmed for the shaper and the STH, each identified using a profile ID. The profiles are set by channel speed, rather than associating a profile to each channel, in order to save memory space. This is possible since many channels may have the same speed. Each profile provides configuration for the shaper operation and for the STH. The profiles are used for identifying the BP count and STH from the memories 33 and 39.

Table below shows by way of an example the values programmed for these profiles; it is to be noted that only 9

A more precise control of traffic flow is obtained by the invention, resulting in reduction of storage space in a given queue by one half. The mechanism proposed by the invention may thus result in avoiding queue overflow altogether. Also, if the size of the queue is selected large enough to hold the amount of traffic which would drain the upstream queue during one round trip time period T, queue underflow will not occur because a new traffic would arrive before the queue becomes empty.

We claim:

1. A method of synchronizing a packet rate R of a traffic flow at an egress side of a queue in a downstream stage with a packet rate R1 at an upstream stage, comprising the steps of:

continuously assessing the status of said queue during each polling period generated by a polling generator to determine whether the queue is in a starving mode or a satisfied mode;

shaping the packet rate at said upstream stage at a rate R1 higher than the packet rate R at the egress of said queue when said queue operates in the starving mode by not transmitting any backpressure pulses; and shaping said rate R1 lower than the rate R when said queue operates in the satisfied mode by transmitting a series of backpressure pulses to the upstream stage, wherein each backpressure pulse comprises a predetermined period of time when traffic from the upstream stage is stopped, followed by a predetermined period of time when the backpressure is turned off to allow transmission of packets and said shaping comprises:

providing a shaping profile for said traffic flow, the shaping profile containing information for shaping backpressure pulses in accordance with a traffic parameter;

shaping backpressure pulses for said traffic flow by determining the period of time when traffic from the upstream stage is stopped and the period of time when the backpressure is turned off to allow transmission of packets; and transmitting a series of shaped backpressure pulses from said downstream stage to said upstream stage.

2. A method as claimed in claim 1, wherein the step of continuously assessing the status of said queue comprises measuring a block occupancy (Q) for said queue and continuously comparing said block occupancy with a starving threshold (STH), wherein said queue operates in said starving mode whenever Q<STH, and operates in said satisfied mode when Q>STH.

3. A method as claimed in claim 2, wherein Q is measured by blocks of data of a preset programmable size.

4. A method as claimed in claim 1, wherein said shaping profile provides a BP_ON period, which defines a programmed amount of polling periods of backpressure to be asserted at said upstream stage.

5. A method as claimed in claim 4, wherein said BP_ON period is determined according to said rate R.

6. A method as claimed in claim 4, wherein said shaping profile provides a BP_OFF period, which defines a programmed amount of polling periods of lack of backpressure.

7. A method as claimed in claim 6, wherein said BP_OFF period is dependent on the overhead carried by said traffic flow.

8. A method as claimed in claim 7, wherein the step of shaping said backpressure pulses comprises:
counting the current amounts of BP_ON and BP_OFF transmitted from the moment when block occupancy exceeded said STH;
comparing said current amounts of BP_ON and BP_OFF with said programmed amounts; and
transmitting backpressure pulses from said downstream stage to said upstream stage until said current amounts equal said programmed amounts.

9. A method as claimed in claim 1, further comprising:
determining that the queue is in an invalid mode whenever Q surpasses a programmable peak threshold; and
transmitting a continuous backpressure signal to stop traffic flow.

10. A backpressure flow control mechanism for synchronizing a packet rate R of a traffic flow at an egress side of a queue in a downstream stage with a packet rate R1 at an upstream stage of a network element, comprising:
means for continuously assessing the status of said queue during each polling period determined by a polling generator to determine whether the queue is in a satisfied mode;
a shaper profile memory for storing a shaping profile for said traffic flow, said shaping profile containing information for shaping backpressure pulses in accordance with a traffic parameter;
means for shaping said rate R1 at a value lower than the rate R by transmitting backpressure pulses based on said shaping profile, whenever said queue operates in the satisfied mode; and
an interface that transmits a series of shaped backpressure pulses from said downstream stage to said upstream stage,
wherein each backpressure pulse comprises a predetermined period of time when traffic from the upstream stage is stopped, followed by a predetermined period of time when the backpressure is turned off to allow transmission of packets; and wherein said means for shaping shapes backpressure pulses for said traffic flow by determining the period of time when traffic from the upstream stage is stopped and the period of time when the backpressure is turned off to allow transmission of packets.

11. A mechanism as claimed in claim 10, wherein said means for continuously assessing the status of said queue comprises:
a block count that measures block utilization Q of said queue;
a thresholds profile memory for storing a starving threshold (STH) determined in accordance with a parameter of said traffic flow;
a comparator for determining when Q becomes higher than said STH and assessing that said queue operates in a starving mode when Q<STH and in a satisfied mode when Q<STH; and
a status memory for storing the state of said queue determined by said comparator.

12. A mechanism as claimed in claim 10, wherein said shaping profile provides a BP_ON period, which defines a programmed amount of polling periods of backpressure to be asserted at said upstream stage.

13. A mechanism as claimed in claim 12, wherein said means for shaping comprises:
a shaper for assessing a current amount of backpressure to said upstream stage, measured from the moment when said queue enters said satisfied mode, said current amount being measured in BP_ON and BP_OFF periods;
a memory for storing said current amount; and
means for comparing said current amount with said programmed amount causing said shaper to transmit backpressure pulses from said downstream stage to said upstream stage until said current amount equals said programmed amount.

14. A mechanism as claimed in claim 12, wherein said BP_ON period is determined according to said rate R.

15. A mechanism as claimed in claim 12, wherein said shaping profile provides a BP_OFF period, which defines a programmed amount of polling periods of lack of backpressure.

16. A mechanism as claimed in claim 15, wherein said BP_OFF period is dependent on the overhead carried by said traffic flow.

17. A traffic management device operating at an upstream stage from a backpressure flow control mechanism for synchronizing the packet rate R of a traffic flow at the egress side of a downstream stage with the packet rate R1 at said upstream stage, comprising:
polling means for assessing the state of a queue at said downstream stage each polling period $T_p$, said $T_p$ being set in accordance with a parameter of said traffic flow; and
a packet transmitter responsive to backpressure pulses for changing the rate R1 between a value R1>R asserted when said polling means establish that said queue operates in a starving mode, and a value R1<R asserted when said polling means establish that said queue operates in a satisfied mode;
wherein each backpressure pulse comprises a predetermined period of time when the traffic management device stops traffic, followed by a predetermined period of time when the backpressure is turned off to allow transmission of packets; and wherein said backpressure pulses have been shaped by:
providing a shaping profile for said traffic flow, the shaping profile containing information for shaping backpressure pulses in accordance with a traffic parameter;
shaping backpressure pulses for said traffic flow by determining the period of time when traffic from the upstream stage is stopped and the period of time when the backpressure is turned off to allow transmission of packets; and
transmitting a series of shaped backpressure pulses from said downstream stage to said upstream stage.

18. A method of synchronizing the packet rate R of a traffic flow at the egress side of a queue in a downstream stage with the packet rate R1 at an upstream stage, comprising the steps of:
continuously assessing the status of said queue;
shaping the packet rate at said upstream stage at a rate R1 higher than the packet rate R at the egress of said queue when said queue operates in a starving mode; and
shaping said rate R1 lower than the rate R when said queue operates in a satisfied mode by:
providing a shaping profile for said traffic flow, in accordance with a traffic parameter;
continuously polling the state of said queue from said upstream stage over a polling period preset for said traffic flow;
once said queue enters said satisfied mode, transmitting backpressure pulses from said downstream stage to said upstream stage, said backpressure pulses being shaped according to said shaping profile, said shaping comprising:
counting the current amount of polling periods when the downstream stage transmitted backpressure pulses from the moment when said queue entered said satisfied mode;
comparing said current amount with a programmed amount; and
transmitting backpressure pulses from said downstream stage to said upstream stage until said current amount equals said programmed amount.

19. A method as claimed in claim 18, wherein said shaping profile is associated with a channel speed.

20. A method as claimed in claim 19, wherein said shaping profile provides a Starving Threshold (STH).

21. A method as claimed in claim 18, wherein said shaping profile provides a BP_ON period, which defines a programmed amount of polling periods of backpressure to be asserted at said upstream stage.

22. A method as claimed in claim 21, wherein said BP_ON period is determined according to said rate R.

23. A method as claimed in claim 18, wherein said shaping profile provides a BP_OFF period, which defines a programmed amount of polling periods of lack of backpressure.

24. A method as claimed in claim 23, wherein said BP_OFF period is dependent on the overhead carried by said traffic flow.

* * * * *